(12) United States Patent
Uchiyama et al.

(10) Patent No.: US 7,021,917 B2
(45) Date of Patent: Apr. 4, 2006

(54) INJECTION MOLDING MACHINE METERING AND CONTROL DEVICE

(75) Inventors: Tatsuhiro Uchiyama, Gotenba (JP); Shingo Komiya, Tsuru (JP)

(73) Assignee: Fanuc LTD, Yamanashi (JP)

( * ) Notice: Subject to any disclaimer, the term of this patent is extended or adjusted under 35 U.S.C. 154(b) by 291 days.

(21) Appl. No.: 10/698,406

(22) Filed: Nov. 3, 2003

(65) Prior Publication Data

US 2004/0091561 A1 May 13, 2004

(30) Foreign Application Priority Data

Nov. 5, 2002 (JP) ............................. 2002-321096

(51) Int. Cl.
*B29C 45/77* (2006.01)
(52) U.S. Cl. ..................................... 425/149; 425/150
(58) Field of Classification Search ................ 425/145, 425/149, 150
See application file for complete search history.

(56) References Cited

U.S. PATENT DOCUMENTS

| 3,860,220 | A | * | 1/1975 | Matsubayashi et al. .... 264/40.7 |
| 4,579,515 | A | * | 4/1986 | Kawaguchi et al. ........ 425/145 |
| 4,787,834 | A | | 11/1988 | Neko |
| 6,386,853 | B1 | * | 5/2002 | Mizuno et al. ............. 425/145 |

FOREIGN PATENT DOCUMENTS

| JP | 49-37955 | | 4/1974 |
| JP | 55-57909 | A | 4/1980 |
| JP | 61-10425 | A | 1/1986 |
| JP | 62-119020 | | 5/1987 |
| JP | 06-155534 | A | 6/1994 |
| JP | 09-187847 | | 7/1997 |
| JP | 2000-334791 | | 12/2000 |
| JP | 2002-248663 | | 9/2002 |

OTHER PUBLICATIONS

Notice of Reasons for Rejection, mailed Feb. 8, 2005.

* cited by examiner

*Primary Examiner*—Tim Heitbrink
(74) *Attorney, Agent, or Firm*—Staas & Halsey LLP

(57) ABSTRACT

The retraction of the screw is controlled on the basis of the pressure deviation between the set resin pressure and the detected resin pressure. Furthermore, the screw is caused to rotate at a set speed. Moreover, when the deviation between the metering completion position and the current screw retraction position drops to a value that is equal to or less than a set value, control of the retraction of the screw based on the pressure deviation is stopped, and the control is switched to positioning control based on the positional deviation. Furthermore, a screw rotational speed command in which the pressure deviation component between the set resin pressure and the current resin pressure is corrected from the screw rotational speed component that is decelerated in proportion to the positional deviation is determined and output.

6 Claims, 5 Drawing Sheets

INJECTION MOLDING MACHINE METERING AND CONTROL DEVICE

BACKGROUND OF THE INVENTION

1. Field of the Invention

The present invention relates to the control of the metering process in an injection molding machine.

2. Description of the Related Art

In the control of the metering process in an injection molding machine, the screw of the injection molding machine is caused to rotate at a set rotational speed, and the screw is retracted to a set metering completion position while the molten resin pressure is controlled to a set back pressure, so that a back pressure is applied to the resin, and the resin is melted and kneaded. Then, when the screw reaches the set metering completion position, the rotation of the screw is stopped, and the metering process is completed.

Such control of the metering process includes various types of universally known control methods, such as control methods in which the rotational speed of the screw is controlled, or control methods in which both the retraction speed of the screw and the rotational speed of the screw are controlled, so that the retracting motion of the screw and the rotation of the screw stop at the set metering completion position (for example, see Japanese Patent Application Laid-Open No. S49-37955, Japanese Patent Application Laid-Open No. S55-57909, Japanese Patent Application Laid-Open No. S61-10425 and Japanese Patent Application Laid-Open No. S62-119020).

Furthermore, an invention in which pressure control is performed up to a switching position that is set slightly in advance of the completion of metering in the metering process, the control is switched to speed control from this switching position on, and the retraction speed of the screw is controlled on the basis of a set speed pattern, is also known (for example, see Japanese Patent Application Laid-Open No. H6-155534).

In the abovementioned conventional methods in which metering is performed with the screw retraction speed or screw rotational speed varied in stages, the rotation of the screw and retraction of the screw can be stopped in the metering completion position. However, immediately prior to the stopping of the retraction and rotation of the screw, the screw merely retracts and rotates in a specified pattern; accordingly, the resin pressure cannot be controlled to a specified pressure, so that variation occurs in the resin pressure. As a result, there is a variation in the quality of the molded articles.

SUMMARY OF THE INVENTION

In a first aspect of the injection molding machine metering method of the present invention, after the screw has been retracted to a set screw position in the vicinity of the set metering completion position, the rotational speed of the screw is controlled on the basis of the positional deviation between the set metering completion position and the current screw retraction position, and the pressure deviation between the set resin pressure and the current detected resin pressure.

In a second aspect of the injection molding machine metering method of the present invention, after the screw has been retracted to a set screw position in the vicinity of the set metering completion position, the rotational speed of the screw that is proportional to the deviation between the set metering completion position and the current screw retraction position is determined, and the rotational speed of the screw is controlled to this rotational speed of the screw as a screw rotational speed command by correcting the rotational speed of the screw on the basis of the pressure deviation between the set resin pressure and the current detected resin pressure.

Furthermore, the injection molding machine control device of the present invention comprises a screw advancing and retracting motor for causing the advancing and retracting motion of the screw, and a screw rotating motor for causing the rotation of the screw; in this control device, metering of the resin is performed by driving the screw advancing and retracting motor so that the screw is retracted to the set metering completion position while driving the screw rotating motor so that the screw is caused to rotate. Furthermore, this control device comprises means for detecting the resin pressure, means for detecting the screw position, means for determining the positional deviation between the set metering completion position and the current screw retraction position, means for determining the pressure deviation between the set resin pressure and the current detected resin pressure, and screw rotational speed adjustment means for adjusting the screw rotational speed command on the basis of the abovementioned positional deviation and the abovementioned pressure deviation after a set screw rotational speed adjustment point has been reached. This control device obtains accurate metering by maintaining the resin pressure at a uniform value, and simultaneously stopping the retraction and rotation of the screw.

The abovementioned control device of the present invention may adopt the following aspects:

The screw rotational speed adjustment means may reduce the corrective rotational speed component, on the basis of the pressure deviation, from the corrective rotational speed component that is proportional to the positional deviation, and take this value as the screw rotational speed command.

The set screw rotational speed adjustment point may be set at a point where the positional deviation has dropped below the set positional deviation.

The control device may further comprise means for measuring the time from the initiation of metering, and the set screw rotational speed adjustment point may be set at a point where a set time has elapsed from the initiation of metering.

The control device may further comprise pressure control means for controlling the retraction of the screw on the basis of the pressure deviation between the set resin pressure and the detected resin pressure, and positioning control means for positioning the screw in the set metering completion position on the basis of the positional deviation between the set metering completion position and the detected screw position, and the control device may be devised so that the retraction of the screw is controlled by the pressure control means up to a set switching point, and a switch is made to screw retraction control by the positioning control means after this set switching point is reached. In this case, the screw rotational speed adjustment point and the switching point may be set as the same point.

The present invention provides a control device which allows control of the metering process that can maintain the resin pressure at a uniform value and achieve accurate metering.

BRIEF DESCRIPTION OF THE DRAWINGS

The abovementioned objects and characterizing features of the present invention, and other objects and characterizing features of the present invention, will become clear from the following description of embodiments with reference to the attached figures. Among these figures.

DESCRIPTION OF THE PREFERRED EMBODIMENTS

Figure 1A:
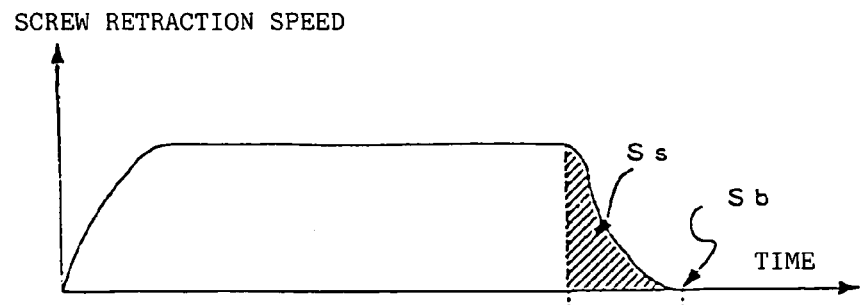
FIGS. 1A through 1C are explanatory diagrams which show the screw retraction speed, screw rotational speed and resin pressure in a case where the present invention is applied.
Figure 1B:
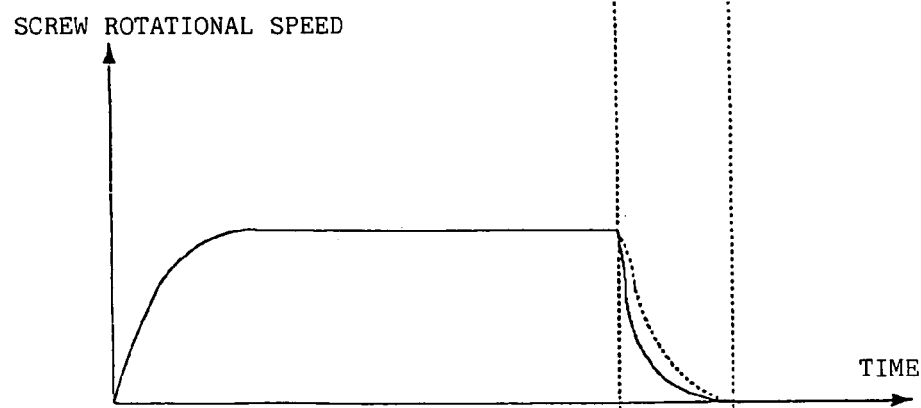
Figure 1C:
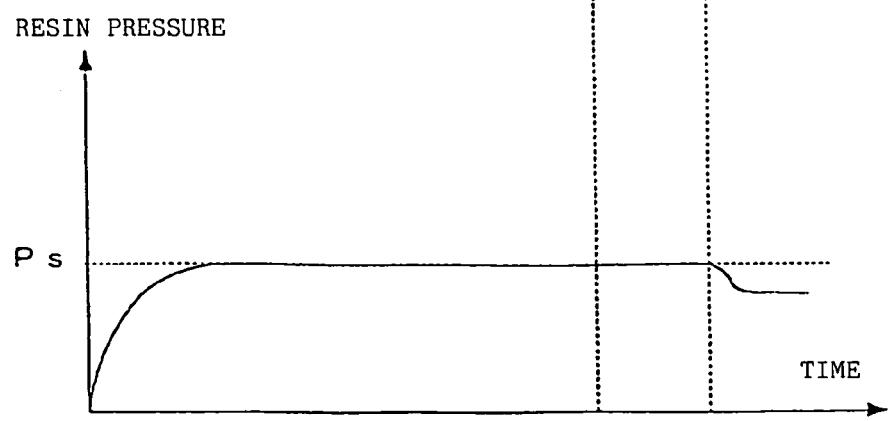
Figure 2A:
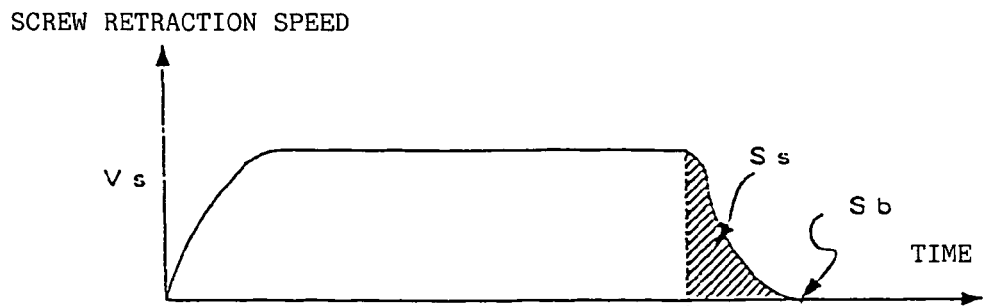
FIGS. 2A through 2C are explanatory diagrams which show the screw retraction speed screw rotational speed and resin pressure in a case where control is performed so that the retraction of the screw and rotation of the screw stop in the metering completion position without the application of the present invention.
Figure 2B:
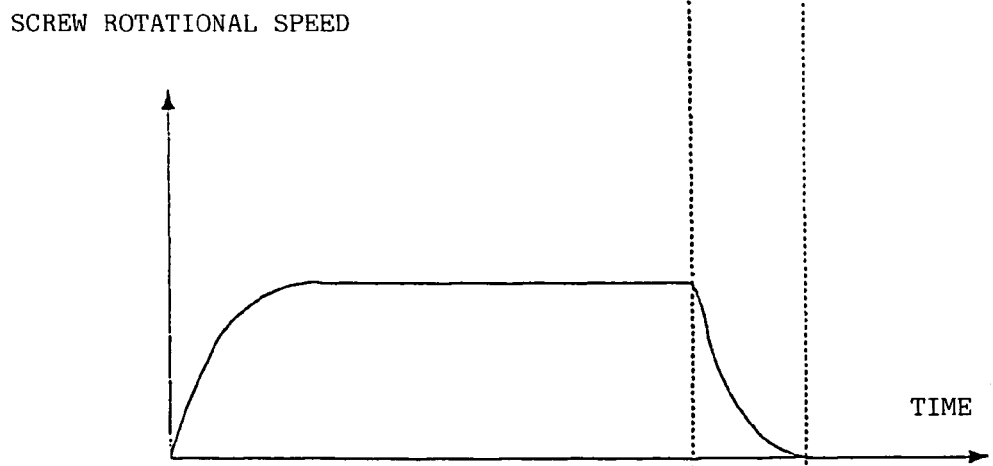
Figure 2C:
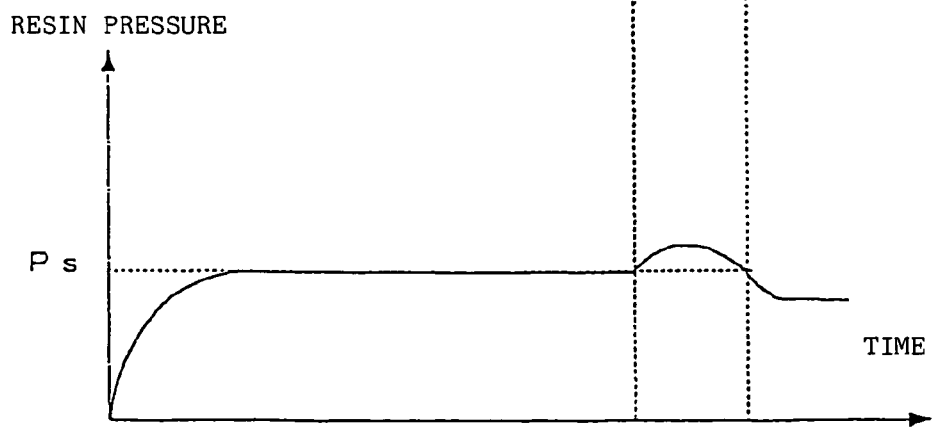

FIGS. 1A through 1C and FIGS. 2A through 2C are explanatory diagrams which illustrate the operating principle of the present invention. FIGS. 1A through 1C are diagrams which respectively show the screw retraction speed, screw rotational speed and resin pressure in a case where the present invention is applied. FIGS. 2A through 2C are diagrams which respectively show the screw retraction speed, screw rotational speed and resin pressure in a case where control is performed so that the retraction of the screw and rotation of the screw stop in the metering completion position without the application of the present invention. The vertical axes in FIGS. 1A and 2A indicates the screw retraction speed, the vertical axes in FIGS. 1B and 2B indicate the screw rotational speed, and the vertical axes in FIGS. 1C and 2C indicate the resin pressure. In all of these figures, the horizontal axis indicates time.

First, a case in which the present invention is not applied will be described with reference to FIG. 2.

When the metering process is entered, the rotational speed of the screw is increased to a set specified rotational speed, and this set specified rotational speed is maintained (see FIG. 2B). Furthermore, the movement commands up to the set metering completion position Sb are stored in an error register which stores the positional deviation, and pressure control is performed on the basis of the set resin pressure and the current resin pressure so that the screw is retracted while decreasing the remaining amount of positional deviation in the error register (see FIG. 2A). As a result, the resin is melted and kneaded, and a set back pressure is applied to the molten resin, so that the resin pressure is maintained at a set pressure (set back pressure) as shown in FIG. 2C.

When the remaining amount of positional deviation Sd approaches the set amount of positional deviation Ss, pressure control is stopped, the screw retraction speed is reduced, and driving control is performed in accordance with the remaining amount of positional deviation Sd, so that the retraction of the screw stops with the screw positioned in the set metering completion position Sb. Furthermore, when the screw retraction speed reaches a specified speed, a screw rotation stop command is output, and the screw is decelerated and stopped, so that the rotation of the screw also stops when the retraction of the screw stops.

Since both the screw retraction speed and the screw rotational speed vary in the vicinity of this metering completion position, control is not performed so that the set resin pressure is obtained. As a result, after the deceleration of the screw retraction speed is initiated, the resin pressure cannot be maintained at the set pressure, as is shown in FIG. 2C. Specifically, in order to obtain the set resin pressure, in cases where the screw retraction speed is relatively slower than the screw rotational speed, there may be cases in which the resin pressure is higher than the set pressure. Conversely, in cases where the screw retraction speed is relatively higher than the screw rotational speed, the resin pressure drops.

This problem is affected by the timing at which screw rotation stop commands are generated. In regard to this timing, furthermore, it is desirable that the rotation of the screw stop at the time that the screw retraction position reaches the metering completion position, but the adjustment of such timing is difficult.

Accordingly, the present invention is devised so that the screw rotational speed is adjusted on the basis of the positional deviation between the set metering completion position of the screw and the actual screw position (the remaining amount of movement to the set metering completion position) and pressure deviation between the set resin pressure (back pressure) and the actual resin pressure, as shown in FIG. 1B, thus making it possible to maintain the resin pressure at the set pressure as shown in FIG. 1C. Furthermore, in FIG. 1, the adjustment of the screw rotational speed is initiated when the amount of the screw positional deviation Sd with respect to the preset metering completion position drops to a value that is equal to or less than the amount of positional deviation Ss set as the rotational speed adjustment point.

Figure 3:
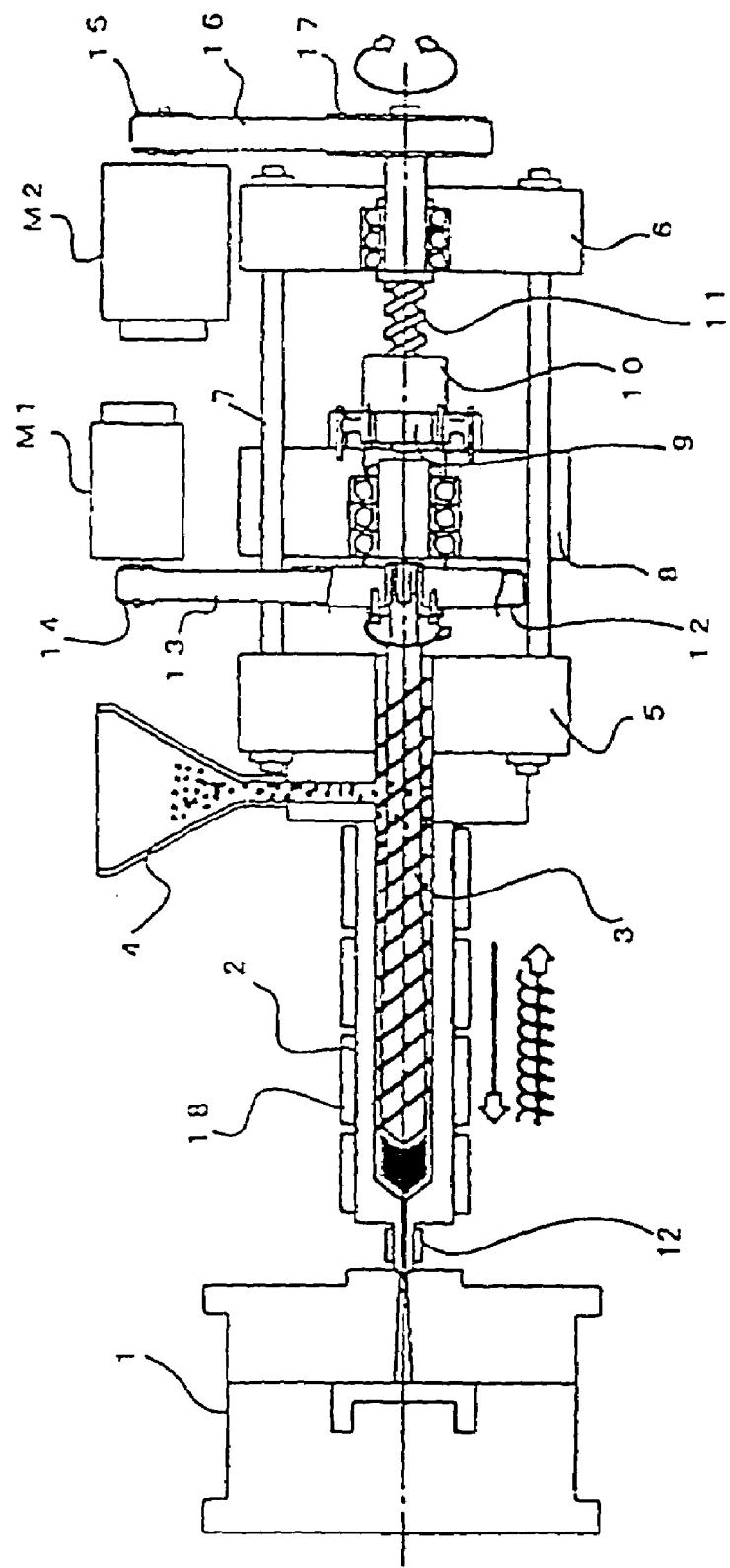
FIG. 3 is a schematic diagram of the injection mechanism part in one example of an injection molding machine to which the present invention is applied.

FIG. 3 is a schematic diagram of the injection mechanism part of one example of an injection molding machine to which the control device of the present invention is applied. In this figure, 1 indicates a metal mold, 2 indicates a cylinder, 3 indicates a screw, 4 indicates a hopper which supplies resin pellets to the interior of the cylinder, 5 indicates a front plate that forms the injection mechanism, and 6 indicates a rear plate. Furthermore, a plurality of guide bars 7 are disposed between the abovementioned front plate 5 and rear plate 6, and a pusher plate 8 is disposed so that this plate can freely move in the forward-rearward direction (left-right direction in the figure) while being guided by these guide bars 7.

The base part of the screw 3 is attached to the abovementioned pusher plate 8 so that the screw 3 is free to rotate, and a driven pulley 12 is attached to this base part. The screw 3 is rotationally driven by a screw rotating servo motor M1 via a driving pulley 14, timing belt 13 and the abovementioned driven pulley 12. Furthermore, the screw rotating servo motor M1 is omitted from the figure; however, this motor is attached to the pusher plate 8 and advances and retracts together with the pusher plate 8.

Furthermore, a ball nut 10 is attached to the pusher plate 8 via a pressure sensor (load cell) 9; a ball screw 11 is screw-engaged with this ball nut 10, and this ball screw 11 is rotationally driven by a screw advancing and retracting servo motor M2 via a driving pulley 15, timing belt 16 and driven pulley 17. As a result, the screw 3 is driven in the axial direction (left-right direction in the figure) via the pusher plate 8.

Figure 4:
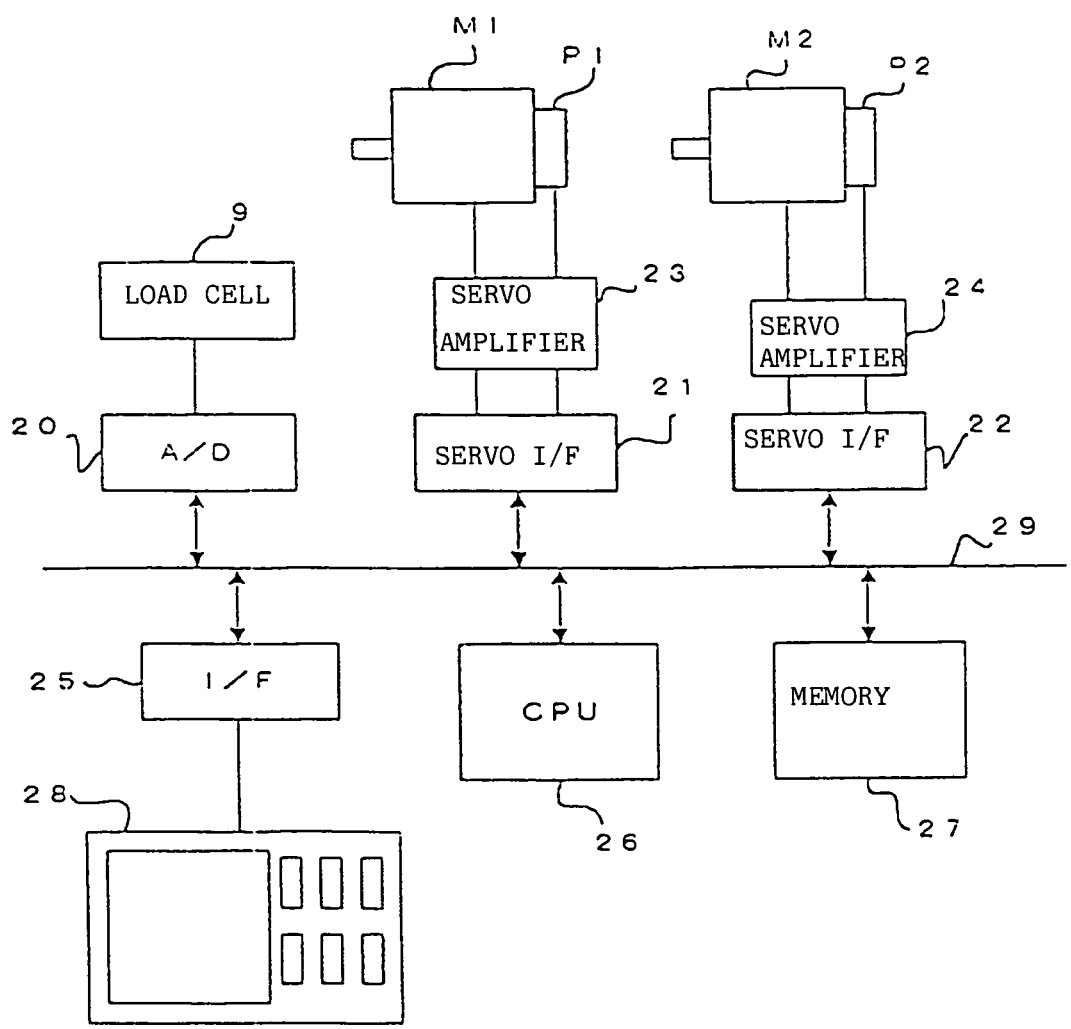
FIG. 4 is a block diagram of essential parts of the control device that controls the injection molding machine in which embodiment of the present invention is applied.

FIG. 4 is a block diagram of the essential parts of the control device that controls this injection molding machine; the control device of the present invention is constructed from this control device shown in FIG. 4.

In FIG. 4, the symbol 26 indicates a processor which controls this injection molding machine as a whole; an A/D converter 20 which converts analog signals into digital signals, servo interfaces 21 and 22, an input-output interface 25, and a memory 27 constructed from a ROM, RAM, nonvolatile RAM or the like are connected to this processor via a bus 29. The pressure sensor (load cell) 9 is connected to the A/D converter 20, and servo amplifiers 23 and 24 are respectively connected to the servo interfaces 21 and 22.

The servo motor M1 and a position/speed detector P1 are connected to the servo amplifier 23. The position and rotational speed of the servo motor M1 are detected by the abovementioned position/speed detector P1, so that the amount of rotation and rotational speed of the screw 3 are detected. The servo amplifier 23 receives movement commands issued by the processor 26 during metering via the servo interface 21, and controls the driving of the servo motor M1 by performing feedback control of the speed, and also performing feedback control of the current (torque), in accordance with the actual speed of the servo motor M1 (rotational speed of the screw) that is detected by the position/speed detector P1 and fed back.

Furthermore, the servo motor M2 and a position/speed detector P2 such as an encoder or the like are connected to the servo amplifier 24. The rotational position and rotational speed of the servo motor M2 are detected by this position/speed detector P2, so that the advancing/retraction position and advancing/retraction speed of the screw 3 are detected. The servo amplifier 24 receives position commands or speed commands output by the processor 26 via the servo interface 22, and controls the driving of the servo motor M2 by performing feedback control of the position and/or speed, and also performing feedback control of the current (torque), in accordance with the rotational position and/or actual speed of the servo motor M2 (speed to the screw) that is detected and fed back by the position/speed detector P2. Furthermore, the servo amplifiers 23 and 24 may be constructed from hardware alone such as electrical circuits or the like; in the present embodiment, however, these servo amplifiers are constructed from so-called digital servo amplifiers which are formed by a processor, ROM, RAM or the like, and which control the position, speed, torque and the like of the servo motors by means of software.

A data input-output device 28 comprising display means constructed from a liquid crystal display or CRT is connected to the input-output interface 25, and the setting of various commands, various parameters and the like can be performed by this input-output device 28, so that various set values, the screw rpm, the screw retraction position and the like (described later) can be displayed by the display means.

The abovementioned construction is the same as the construction in a conventional injection molding machine control device; however, this control device differs from a conventional injection molding machine control device in that the device comprises functional means for controlling the resin pressure in the metering process, and performing control so that the retraction of the screw and the rotation of the screw both stop when metering is completed.

Figure 5:
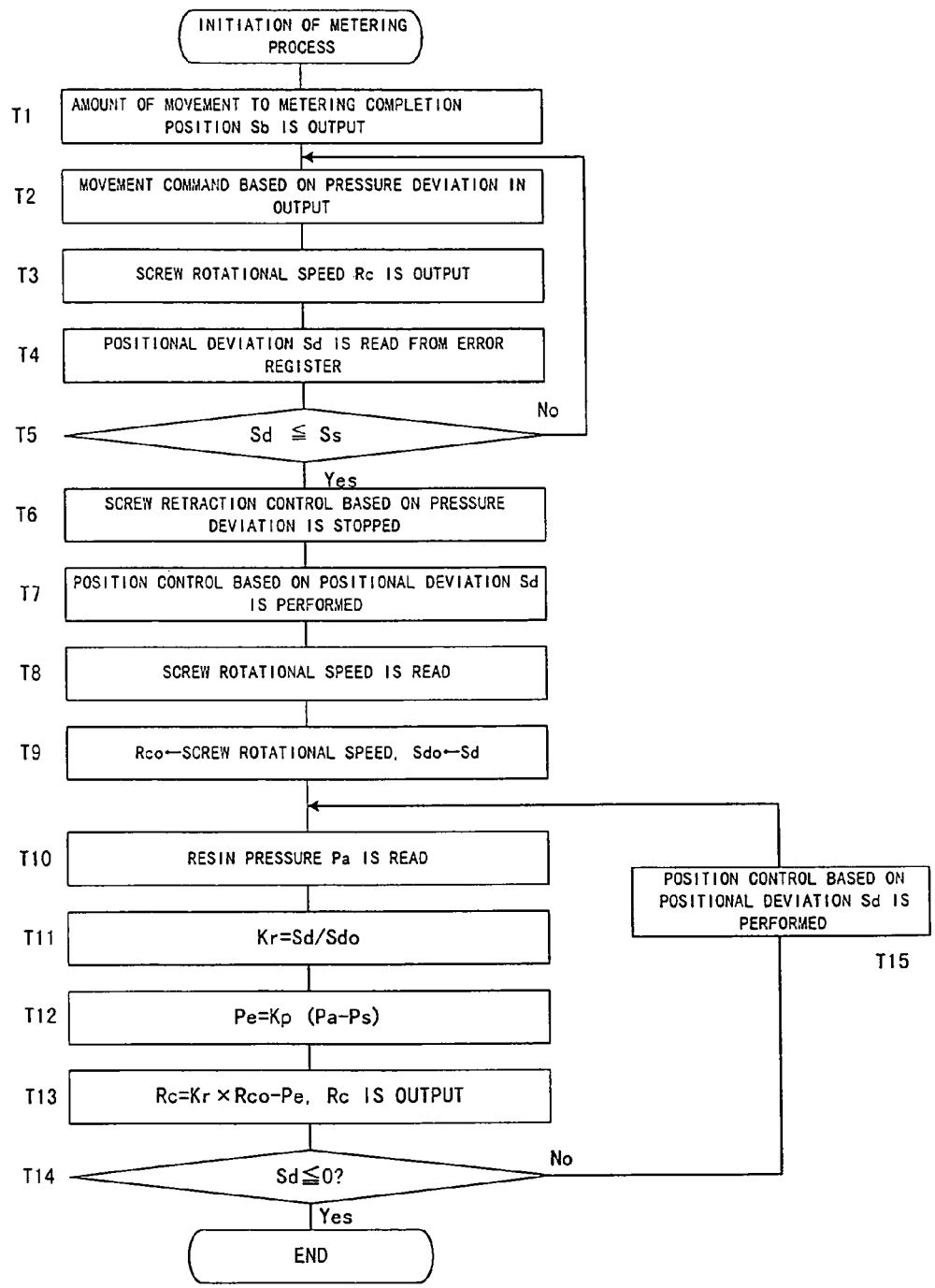
FIG. 5 is an operational processing flow chart of the metering process in the embodiment.

FIG. 5 is a flow chart of the operational processing in the metering process performed by the processor 26 of the control device.

When the metering process is entered, the processor 26 outputs the amount of movement (for the screw advancing and retracting servo motor M2) that retracts the screw to the set metering completion position Sb to the servo amplifier 24 via the servo interface 22 (step T1). This amount of movement is stored in an error register which is provided for position loop control within the servo amplifier 24. Furthermore, the processor 26 reads the resin pressure Ps detected by the pressure sensor (load cell) 9 via the A/D converter 20, and determines the screw retraction movement command on the basis of the pressure deviation between the set resin pressure Pa and this detected resin pressure. This determined screw retraction movement command is output to the servo amplifier 24 via the servo interface 22 (step T2). Initially, the amount of movement to the metering completion position Sb is stored in the error register inside the servo amplifier 24. However, position loop control based on the positional deviation stored in this error register is not performed; the driving of the screw advancing and retracting servo motor M2 is controlled on the basis of movement commands based on the pressure deviation.

Furthermore, a command Rc which causes the screw to rotate at the screw rotational speed that has been set (initially the set speed) is output to the servo amplifier 23 via the servo interface 21 (step T3).

When the servo amplifier 24 receives a retraction movement command based on the pressure deviation, feedback control of the speed is performed on the basis of this retraction movement command and speed information that is fed back from the speed detector P2, so that the screw advancing and retracting servo motor M2 is caused to move. As a result, back pressure control is accomplished by feedback control of the resin pressure.

Furthermore, the servo amplifier 23 receives screw rotation commands, and performs feedback control of the speed on the basis of the set rotational speed specified by these commands and speed information that is fed back from the position/speed detector P1, so that the screw rotating servo motor M1 is caused to rotate at the set speed. Thus, as is shown in FIG. 1A and FIG. 1B, the screw is retracted while pressure control is performed, and rotation is initiated at the set rotational speed, so that the resin is melted and kneaded.

Next, the processor 26 subtracts the position information that is fed back from the position/speed detector P2, reads out the value Sd of the error register that stores the positional deviation at the current point in time (step T4), and compares this value with the positional deviation Ss set as the rotational speed adjustment point and switching point from pressure control to positioning control (step T5).

If the current positional deviation Sd that is read out is greater than the set positional deviation Ss, the processing returns to step T2, and the processing in step T2 through step T5 is repeated until the positional deviation Sd is equal to or less than the set positional deviation Ss. The screw 3 is retracted at a retraction speed based on the pressure deviation as shown in FIG. 1A, and the screw 3 continues to rotate at the set speed as shown in FIG. 1B. Furthermore, the resin pressure is maintained at the set resin pressure as shown in FIG. 1C.

When the positional deviation Sd drops to a value that is equal to or less than the set positional deviation Ss, movement commands based on the pressure deviation are stopped (pressure feedback control is stopped), and control is switched to position loop control based on the positional deviation (remaining amount of movement to the set metering completion position Sb) that is stored in the error register, so that positioning control is initiated (steps T6 and T7). Furthermore, the screw rotational speed that is fed back from the position/speed detector P1 via the servo interface 21 is read out. Then, this read-out screw rotational speed is stored as the screw rotation deceleration initiation speed Rco, and the positional deviation Sd determined in step T4 is stored as the positional deviation Sdo at the time that deceleration of the rotation of the screw is initiated (steps T8 and T9).

Next, the resin pressure Pa detected by the pressure sensor (load cell) 9 is read out via the A/D converter 20 (step T10). Furthermore, the correction coefficient Kr of the screw rotational speed based on the positional deviation Sd is determined. In this embodiment, this correction coefficient Kr is determined by dividing the current screw positional deviation Sd by the positional deviation Sdo at the time that deceleration of the rotation of the screw is initiated (step T11).

$$Kr = Sd/Sdo \quad (1)$$

In regard to the positional deviation, since the positional deviation Sdo at the time that deceleration of the rotation of the screw is initiated is the greatest deviation, the correction coefficient Kr is initially "1"; subsequently, however, this coefficient gradually decreases (assumes a value of no more than 1) as the positional deviation Sd decreases.

The amount of correction Pe of the screw rotational speed is determined by multiplying the value obtained by subtracting the set resin pressure (set back pressure) Ps from the resin pressure Pa read out in step T10 by a rotational speed conversion coefficient Kp based on the pressure deviation (step T12).

$$Pe = Kp(Pa-Ps) \quad (2)$$

Furthermore, the screw rotational speed command Rc is determined by subtracting the rotational speed correction amount Pe determined in step T12 from a value obtained by multiplying the screw rotational speed Rco stored in step T8 by the correction coefficient Kr determined in step T11 (step T13).

$$Rc = Kr \times Rco - Pe \quad (3)$$

Then, a judgement is made as to whether or not the positional deviation Sd is "0" or less (step T14). If the positional deviation Sd is not 0 or less, the screw retraction position is controlled by performing position loop processing on the basis of the positional deviation Sd (step T15), and the processing returns to step T10.

Afterward, the processing in steps T10 through T15 is repeated.

The screw is retracted, and as the screw approaches the metering completion position, the positional deviation Sd decreases, and the retraction speed of the screw is reduced. Furthermore, as the positional deviation Sd decreases, the correction coefficient Kr (=Sd/Sdo) also decreases. Furthermore, for example, if the resin pressure Pa coincides with the set resin pressure Ps, then, from the abovementioned equation (2), the rotational speed correction amount Pe is "0", and from the abovementioned equation (3), the screw rotational speed command Rc decreases by an amount corresponding to the decrease in the correction coefficient Kr, so that the rotational speed of the screw decreases as the positional deviation decreases (i. e., when this deviation decreases as the metering completion position is approached)

On the other hand, in cases where the detected current resin pressure Pa is greater than the set resin pressure (set back pressure) Ps, then, from the abovementioned equation (2), the rotational speed correction amount Pe determined in step T12 has a positive value, and since the screw rotational speed command Rc is determined by subtracting this rotational speed correction amount Pe with a positive value in the calculations of the abovementioned equation (3) performed in step T13, the value of the screw rotational speed command Rc decreases, so that the rotational speed of the screw 3 drops. Since the resin pressure drops as a result, the resin pressure is controlled so that this pressure equals the set resin pressure (set back pressure). Conversely, if the detected resin pressure Pa drops below the set resin pressure Ps, the rotational speed correction amount Pe becomes negative, so that the value of the screw rotational speed command Rc is increased. Accordingly, the screw rotational speed increases, and the resin pressure also rises and is thus controlled so that this pressure equals the set resin pressure.

Furthermore, when the positional deviation Sd decreases, the correction coefficient Kr determined in the processing of the abovementioned equation (1) in step T11 decreases. For example, when the set metering completion position is approached so that the positional deviation Sd has a value that is very close to "0", this correction coefficient Kr also assumes a value that is very close to "0". As a result, the term "Kr×Rco" in the abovementioned equation (3) that is calculated in step T13 becomes small, so that the effect of the rotational speed correction amount Pe that is determined by the pressure deviation increases, and the rotational speed of the screw is controlled so that the resin pressure coincides with the set resin pressure.

Then, when the positional deviation Sd drops to a value that is equal to or less than "0" (step T14), the screw 3 is positioned and maintained in the set metering completion position Sb, and the rotation of the screw 3 also stops, so that the processing of the metering process is ended.

Thus, the resin pressure is controlled so that this pressure is maintained at the set resin pressure, and linked control is performed so that the rotation of the screw stops at the point in time at which the screw retraction position reaches the metering completion position.

In the abovementioned embodiment, the timing at which the speed adjustment of the rotational speed of the screw is initiated (the timing at which deceleration processing is initiated) is judged from the amount of positional deviation between the current screw retraction position and the set metering completion position. However, it would also be possible to judge the timing at which this speed adjustment of the rotational speed of the screw is initiated (the timing at which deceleration processing is initiated) according to the time elapsed from the initiation of metering by the retraction of the screw. Specifically, in this case, the processing in step T5 is changed to processing which makes a judgement according to the time elapsed from the initiation of metering.

In the abovementioned embodiment, the screw rotational speed command Rc is determined by detecting the actual screw rotational speed at the time that deceleration of the screw rotational speed is initiated (step T8), and performing the calculations of the abovementioned equation (3) in step T13 using this detected rotational speed Rco. However, since the actual screw rotational speed at the time that deceleration of the screw rotational speed is initiated is more or less equal to the set screw rotational speed, it would also be possible to take the set screw rotational speed as the value of "Rco" in the abovementioned equation (3) calculated in step T13, without reading out and detecting the actual rotational speed of the screw in step T8.

In the abovementioned embodiment, the position at which the deceleration of the retraction of the screw is initiated is set as the screw position at which the current screw positional deviation drops to a value that is equal to or less than a preset positional deviation. However, in cases where the screw retraction speed is high, it is desirable to initiate deceleration from a screw position that is distant from the metering completion position in order to ensure an appropriate adjustment operation of the screw rotational speed. Accordingly, it would also be possible to devise the control device so that the screw retraction speed during metering is monitored, and so that positional control of the retraction of the screw is initiated by determining the deceleration initiation position, i. e., the comparative value of the positional deviation, in accordance with the monitored screw retraction speed, and comparing the determined comparative value of the positional deviation and the current screw positional deviation.

Furthermore, in the abovementioned embodiment, the timing of the initiation of the deceleration of the screw retraction speed and the timing of the initiation of the adjustment of the screw rotational speed are the same; however, it would also be possible to initiate the adjustment of the screw rotational speed at any timing from around the point at which the deceleration of the screw retraction speed is initiated to the point at which the screw stops. Moreover, in the abovementioned embodiment, the rotational speed adjustment point and the switching point at which the control is switched from pressure control to positioning control are set as the same point; however, these points may also be different points.

Furthermore, in the abovementioned embodiment, the present invention is described using an electrically driven injection molding machine as an example; however, the present invention may also be applied to hydraulic type injection molding machines.

In the present invention, the resin pressure can be maintained at a set pressure even during deceleration of the screw retraction speed. Furthermore, the retraction of the screw is stopped in the set metering completion position, and the rotation of the screw is also stopped, so that metering in which an accurate and uniform resin pressure is maintained can be performed, thus eliminating variation in the quality of the molded products.

What is claimed is:

1. A control device in an injection molding machine comprising a screw driving apparatus used to advance and retract the screw, and a screw rotating motor used to rotate the screw, wherein metering of the resin is performed by driving the screw driving apparatus so that the screw is retracted to the set metering completion position while driving the screw rotating motor so that the screw is caused to rotate, said control device comprising:
means for detecting the resin pressure;
means for detecting the screw position;
means for determining the positional deviation between the set metering completion position and the current screw retraction position;
means for determining the pressure deviation between the set resin pressure and the current detected resin pressure; and
screw rotational speed adjustment means for adjusting the screw rotational speed command on the basis of said positional deviation and said pressure deviation after a set screw rotational speed adjustment point has been reached.

2. The injection molding machine control device according to claim 1, wherein said screw rotational speed adjustment means adds or subtracts a correction rotational speed component based on said pressure deviation to or from a correction rotational speed component that is proportional to said positional deviation, and take the result as the screw rotational speed command.

3. The injection molding machine control device according to claim 1 or claim 2, wherein said set screw rotational speed adjustment point is determined on the basis of the relationship between the current positional deviation and a set positional deviation.

4. The injection molding machine control device according to claim 1 or claim 2, comprising means for measuring the elapsed time from the initiation of metering, wherein said set screw rotational speed adjustment point is set at a point in time at which the set time has elapsed from the initiation of metering.

5. The injection molding machine control device according to claim 1 or claim 2, further comprising:
pressure control means for controlling the retraction of the screw on the basis of the pressure deviation between the set resin pressure and the detected resin pressure; and
positioning control means for positioning the screw in the set metering completion position on the basis of the positional deviation between the set metering completion position and the detected screw position;
wherein the retraction of the screw is controlled by said pressure control means until a set switching point is reached, and control is switched to screw retraction control by said positioning control means after the set switching point is reached.

6. The injection molding machine control device according to claim 5, wherein said screw rotational speed adjustment point is set as said switching point.

* * * * *

UNITED STATES PATENT AND TRADEMARK OFFICE
CERTIFICATE OF CORRECTION

| | | |
|---|---|---|
| PATENT NO. | : 7,021,917 B2 | Page 1 of 1 |
| APPLICATION NO. | : 10/698406 | |
| DATED | : April 4, 2006 | |
| INVENTOR(S) | : Tatsuhiro Uchiyama et al. | |

It is certified that error appears in the above-identified patent and that said Letters Patent is hereby corrected as shown below:

In the drawings, Fig. 4, (beside box M2), change ° 2 to --P2--

Column 3, line 13, after "speed" insert --,--

Column 7, line 62, after "approached)" insert--.--

Signed and Sealed this

Fifteenth Day of August, 2006

JON W. DUDAS
*Director of the United States Patent and Trademark Office*